March 12, 1968     F. J. LOWES     3,372,431
APPARATUS FOR PREPARATION OF STRUCTURES
Filed Jan. 24, 1966
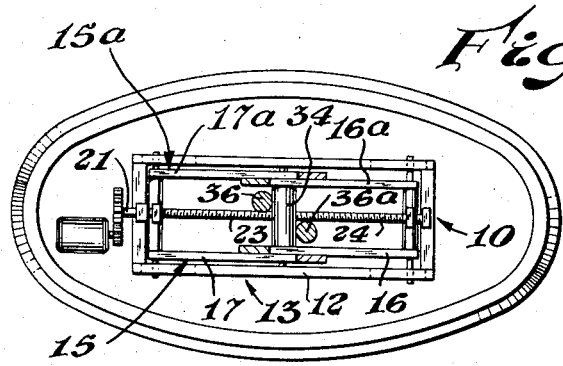
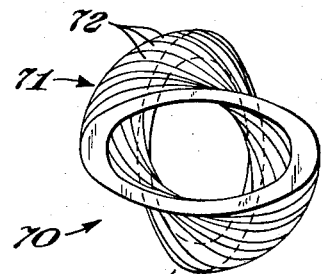
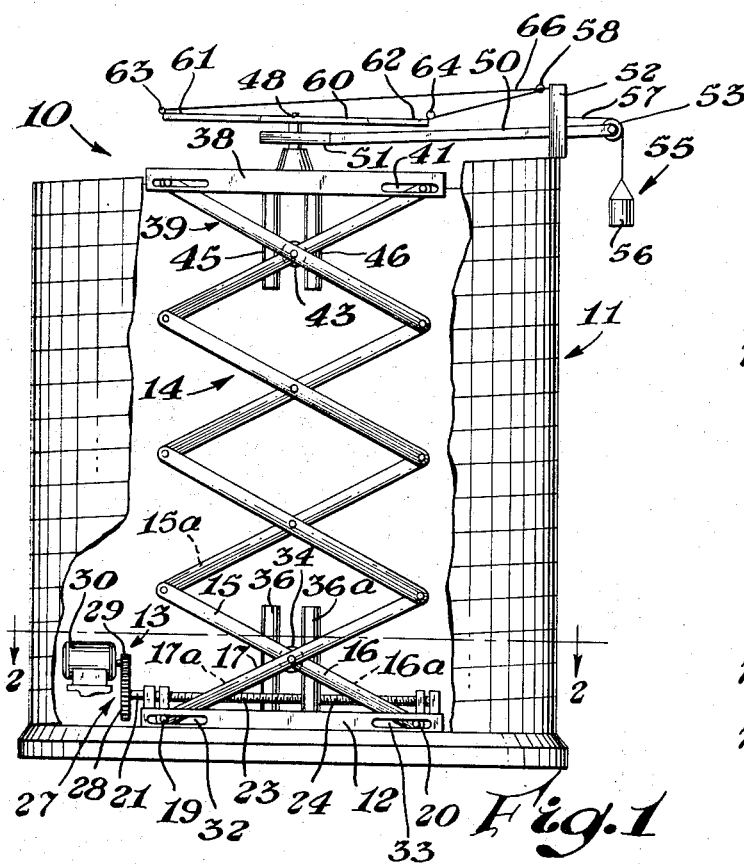
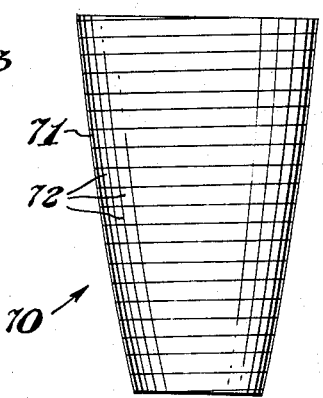
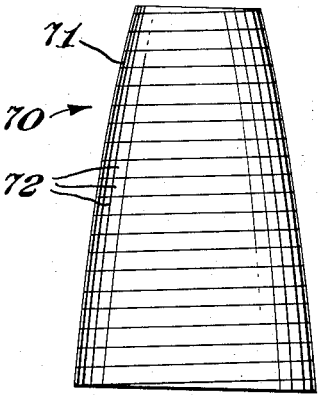
INVENTOR.
Fred J. Lowes
BY
AGENT

United States Patent Office 3,372,431
Patented Mar. 12, 1968

3,372,431
APPARATUS FOR PREPARATION OF
STRUCTURES
Fred J. Lowes, Midland, Mich., assignor to The Dow
Chemical Company, Midland, Mich., a corporation of
Delaware
Filed Jan. 24, 1966, Ser. No. 522,450
6 Claims. (Cl. 18—5)

This invention relates to an apparatus for the production of structures and more particularly relates to an apparatus for the production of structures having an elliptical cross sectional configuration.

Oftentimes it is desired to construct a structure or building having the form of an elliptical cylinder. Such structures are readily fabricated from materials such as bricks or foamed products and oftentimes it is desired to deposit a building material in such a form as to result in a structure having a configuration of an elliptical cylinder or a configuration similar to an elliptical cylinder. A number of improved methods of building construction are known including the slip forming of concrete that is a method of pouring concrete or other hardenable substances in a more or less continuous manner wherein a form or mold is progressively moved about the periphery of a structure, material added thereto and the form moved to an adjacent location, additional material added to result in a monolithic structure.

Extremely advantageous and beneficial monolithic structures are prepared from synthetic resinous plastic foamed materials by depositing foam or foam strips in a predetermined pattern to prepare structures of various types including domes, cylinders and the like. Methods and apparatus for preparing such structures are described in Belgian Patent 612,405.

It would be advantageous if there were available an apparatus for the preparation of structures having the configuration of an elliptical cylinder.

It would be further advantageous if such an apparatus were relatively simple.

It would also be beneficial if there were available an apparatus which would prepare structures having an elliptical cross section and a generally helical or twisted configuration.

These benefits and other advantages in accordance with the present invention are achieved in an apparatus comprising a base adapted to support and position a building material depositing head, means to support the head and position it continuously about an ellipse lying in a plane generally parallel to the base. Means to continuously position the operating head in a direction generally normal to the base in the described ellipse.

Further features and advantages of the present invention will become more apparent from the following taken in connection with the drawing wherein:

In FIGURE 1 there is a schematic cut away view of an apparatus in accordance with the invention constructing a structure having the configuration of an elliptical cylinder.

FIGURE 2 is a view of the apparatus of FIGURE 1 taken along the line 2—2.

FIGURES 3, 4 and 5 are views of a helically distorted elliptical cylinder structure which may be prepared by the alternate embodiment of the invention depicted in FIGURE 6.

In FIGURE 1 there is schematically illustrated an apparatus in accordance with the invention generally designated by the reference numeral 10. Also depicted is a cut away schematic representation of an elliptical cylinder 11 prepared by the apparatus 10. The apparatus 10 comprises in cooperative combination a base 12 having an elevating mechanism generally designated by the reference numeral 13. The elevating mechanism 13 comprises a lazy tongs assembly 14 comprising two generally parallel lazy tongs 15 and 15a. The lazy tongs assembly 14 has terminal arms 16 and 16a, 17 and 17a. An internally threaded cross piece 19 joins the arms 17 and 17a. A second internally threaded cross piece 20 joins the arms 16 and 16a. A rotatably threaded shaft 21 passes through the cross pieces 19 and 20 and engages internally threaded apertures therein. The shaft 21 has a first externally threaded portion 23 and a second externally threaded portion 24 each of the portions have threads of like pitch and opposite hand. A shaft rotating means 27 is secured to shaft 21 adjacent threaded portion 23, the shaft rotating means 27 comprises a spur gear 28, a pinion gear 29 and a gear head motor 30. The base 12 defines a pair of slots 32 adapted to slideably receive the terminal portions of the arms 17 and 17a and a pair of slots 33 adapted to receive the terminal portions of the arms 16 and 16a. The lazy tongs assembly 14 includes a laterally extending cross piece 34 extending between the first joint of the lazy tongs assembly 15 and 15a rigidly secured to the base and bearing or steady means 36 and 36a to prevent lateral movement of the cross piece 34. A support 38 is secured to a top end 39 of the lazy tongs assembly 14 remote from the base 12. The support 38 defines a first pair of slots 40 adapted to receive the terminal portion of the arms of the lazy tongs assembly 15 and 15a. A second pair of slots 41 are adapted to receive the oppositely disposed arms of the lazy tongs assembly 15 and 15a. Oppositely disposed from the cross piece 34 is a second cross piece 43 extending between the lazy tongs assembly 15 and 15a. A second pair of steady means 45 and 46 are dependent from the support means 38 and engage the cross piece 43. The support 38 carries a pivot 48, the axis of pivot 48 lies on the axis of elliptical cylinder to be generated. A support arm 50 is pivotally attached to the pivot 48 and is adapted to rotate about the pivot. Beneficially the support arm 50 is articulated in a location 51 generally adjacent the pivot 48. The arm 41 terminates in a sheave or pulley 53 disposed remotely from the pivot 48 and the material dispensing head 52 is disposed between the pulley 53 and pivot 48. An operating head tensioning means 55 is in cooperative combination with the head 52 at tension means 55 comprising a weight 56 and a cable 57 is so constructed and arranged so as to tension the head 52 away from the pivot 48. A swivel eye 58 is affixed to the head 52 and is remotely disposed from the pivot 48. A fixed arm 60 is rigidly affixed to the pivot 48 and remotely disposed from the support means 38. The fixed arm 60 has a first end 61 and a second end 62. A swivel eye 63 is affixed to the first end 61 of the fixed arm 60. A second swivel eye 64 is secured to the second end 62 of the fixed arm 60. The swivel eyes 63 and 64 are generally equidistant from the center of the pivot 48. A cable 66 of a fixed length is secured to the swivel eyes 63 and 64 and passes through the swivel eye 58 of the material depositing head 52. The swivel eyes 58, 63 and 64 and the cable 66 are so constructed and arranged so as to permit continuous rotation of the arm 50 and the material depositing head 52 about the axis of the pivot 48 and the axis of the elliptical cylinder to be generated.

In FIGURE 2 there is illustrated a schematic representation of a sectional view of the assembly of FIGURE 1 depicts the base 12 a structure and operating mechanism for a lazy tongs assembly 14.

In FIGURES 3, 4 and 5 there is illustrated three schematic representation (top, side and front views) of a distorted elliptical cylinder generally designated by the reference numeral 70. The elliptical cylinder 70 comprises a wall 71 made up from a plurality of generally helically disposed strips 72. The distorted elliptical cylinder 70 has a generally helical configuration analogous to that of twisted ribbon.

In operation of the apparatus of FIGURE 1, suitable material depositing head such as the head 52 is affixed to the support arm and the support arm is rotated about the pivot 41 at a rate convenient to the rate at which a material depositing head supplied the construction material. As the arm 50 rotates about the pivot 48 and deposits successive layers of building material, the support 38 is raised at a rate equal to the increase height of the elevating mechanism 13. Thus, elliptic cylinders are readily prepared for dimensions being primarily dependent upon the length of the cable 66 and the arm 60. The weight 56 assures that the head 52 lies on the desired periphery of the ellipse at all times.

Beneficially employing the method of Belgian Patent 612,405, foam plastic elliptical cylinders are readily generated and beneficially, for many applications, such cylinders are cut along the major or minor axis to provide an elongated building having a semi elliptical configuration.

In FIGURE 6 there is illustrated a fractional view of an alternate base arrangement for use in apparatus in accordance with the present invention, and is particularly suited to prepare distorted elliptical cylinders such as is illustrated in FIGURES 3, 4 and 5. The modification is generally designated by the reference numeral 80. The modification 80 comprises a fixed base 81 adapted to rest on the ground or other suitable foundation or support. The fixed base 81 has centrally disposed therein a pivot 82. A lazy tongs base 83 is pivotally fixed to the pivot 82 and is adapted to rotate about an axis generally normal to the place of the fixed base 81. A ring gear 85 is rigidly affixed to the lazy tongs base 83. A motor or rotating means 86 is secured to the fixed base 81 and in operative engagement with the ring gear 85 by means of a pinion gear 87 affixed thereto. The lazy tongs base 83 has a lazy tongs elevating mechanism 88 comprising in cooperative combination a motor 89 having fixed thereto a pinion gears 90 which is in engagement with a spur gear 91, which is rigidly affixed to an elevating screw 92, in a mat substantially identical to the arrangement of FIGURE 1. Employing the embodiment of FIGURE 6, construction of an elliptic cylinder is accomplished substantially in the manner of the apparatus of FIGURE 1, with the exception that the lazy tongs base 83 is rotated at a rate sufficient to impart to the structure of the desired helical deviation from a true elliptic cylinder.

As is apparent from the foregoing specification the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In an apparatus for the generation of structures by the incremental positioning of the building material utilizing a positionable building material depositing head the improvement which comprises means to rotate the head about a fixed axis, means to continuously position the head on a generally elliptical path as the head rotates about the axis.

2. The apparatus of claim 1, including an elevating mechanism adapted to raise the depositing head as successive layers of building material are deposited.

3. The apparatus of claim 2, wherein the material depositing head is supported by an arm rotatable about a fixed axis, the arm being supported at the fixed axis by a pivot, the pivot being supported by a movable base, the base being movable along the fixed axis, a guide arm secured to the pivot and maintained in fixed relationship to the support, a cable secured to opposite ends of the arm, a cable secured to the material depositing head and so constructed and arranged so as to permit rotation of the arm and head continuously about the pivot.

4. The apparatus of claim 1, wherein the material depositing head is adapted to deposit a foamed plastic material.

5. The apparatus of claim 1, including means to rotate the ellipse being traced by the material depositing head about a fixed central axis.

6. The apparatus of claim 3, wherein the elevating means comprises a pair of lazy tongs assembly.

References Cited

UNITED STATES PATENTS

| | | |
|---|---|---|
| 1,126,323 | 1/1915 | Webb et al. |
| 1,127,369 | 2/1915 | Nash. |
| 3,120,047 | 2/1964 | Crom. |
| 3,206,899 | 9/1965 | Wright. |
| 3,336,631 | 8/1967 | Smith. |
| 3,336,632 | 8/1967 | Smith. |

WILLIAM J. STEPHENSON, *Primary Examiner.*